United States Patent
Sugawara

(10) Patent No.: US 8,369,764 B2
(45) Date of Patent: Feb. 5, 2013

(54) FIXING MEMBER, FIXING DEVICE, AND IMAGE FORMING APPARATUS

(75) Inventor: Tomoaki Sugawara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 263 days.

(21) Appl. No.: 12/735,767

(22) PCT Filed: Mar. 12, 2009

(86) PCT No.: PCT/JP2009/055384
§ 371 (c)(1),
(2), (4) Date: Aug. 16, 2010

(87) PCT Pub. No.: WO2009/116607
PCT Pub. Date: Sep. 24, 2009

(65) Prior Publication Data
US 2010/0310290 A1    Dec. 9, 2010

(30) Foreign Application Priority Data

Mar. 21, 2008   (JP) ................. 2008-072727

(51) Int. Cl.
*G03G 15/20* (2006.01)
(52) U.S. Cl. ..................................... 399/333
(58) Field of Classification Search ............. 399/333, 399/328, 331; 219/216
See application file for complete search history.

(56) References Cited

U.S. PATENT DOCUMENTS

| 6,459,878 | B1 | 10/2002 | Tomoyuki et al. |
| 2002/0051662 | A1 | 5/2002 | Nagafuji |
| 2004/0247352 | A1* | 12/2004 | Oishi et al. ............ 399/333 |

FOREIGN PATENT DOCUMENTS

| JP | 04166970 A | 6/1992 |
| JP | 3804753 A | 1/2002 |
| JP | 2002003732 A | 1/2002 |
| JP | 3969942 A | 3/2002 |
| JP | 2002128931 A | 5/2002 |
| JP | 2002148988 A | 5/2002 |
| JP | 2002317064 A | 10/2002 |
| JP | 2003098881 A * | 4/2003 |
| JP | 2005-084077 A | 3/2005 |
| JP | 2005-292218 A | 10/2005 |
| JP | 2006133576 A | 5/2006 |
| JP | 2006-209156 | 8/2006 |
| JP | 2007-047321 A | 2/2007 |
| JP | 2007139847 A | 6/2007 |

(Continued)

OTHER PUBLICATIONS

International Search Report dated Apr. 4, 2009.

(Continued)

*Primary Examiner* — Quana M Grainger
(74) *Attorney, Agent, or Firm* — Harness, Dickey & Pierce, P.L.C.

(57) ABSTRACT

A fixing member is included on a fixing rotational body having a heat source built therein. The fixing rotational body is configured to fix unfixed toner onto a recording medium as the recording medium carrying the unfixed toner passes through a nip portion formed between the fixing rotational body and a pressurizing unit that comes into pressure contact with the fixing rotational body via the recording medium. The fixing member is made of silicon rubber including carbon fiber, wherein vacant spaces are formed in the silicon rubber.

7 Claims, 7 Drawing Sheets

FOREIGN PATENT DOCUMENTS

| | | |
|---|---|---|
| JP | 2007-170473 A | 7/2007 |
| JP | 2007-292874 A | 11/2007 |
| JP | 2008191557 A | 8/2008 |
| JP | 2008197585 A | 8/2008 |

OTHER PUBLICATIONS

Abstract of JP-2002-012696 published Jan. 15, 2002, which correspond to JP-3804753-A.

Abstract of JP-2002-070838 published Mar. 8, 2002 which corresponds to JP-3969942-A.

Abstract of JP-2003-344891 published Dec. 3, 2003 which corresponds to JP-2002148988-A.

"Thermophysical Properties Handbook", *Japan Soc. of Thermophysical Propoerties*, Yokendo, 1990, pp. 176-177 and partial English translation thereof.

Office Action dated Oct. 8, 2010 issued in corresponding Japanese Application No. 2008-072727.

\* cited by examiner

HEAT FROM HEATER

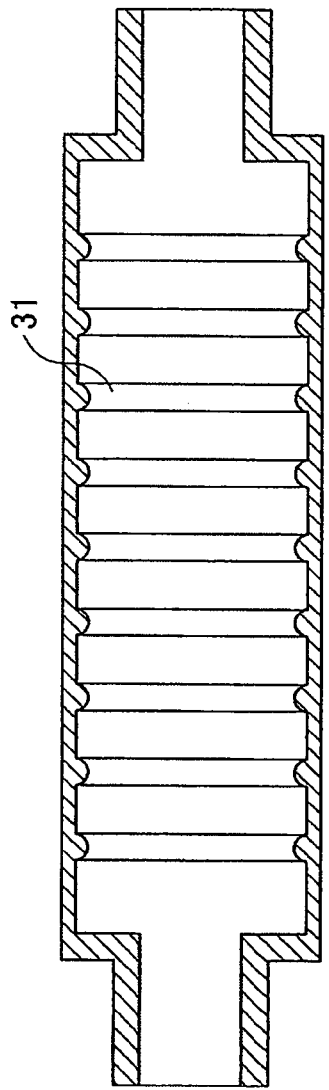
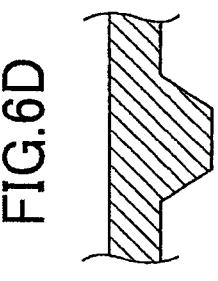
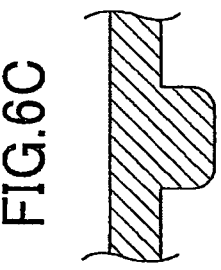
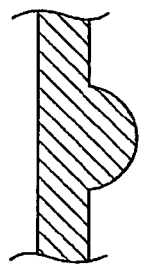
FIG.6A
FIG.6B
FIG.6C
FIG.6D

CARBON FIBER / NOT HEAT-TREATED

CARBON FIBER / HEAT-TREATED AT 600°C

FIXING MEMBER, FIXING DEVICE, AND IMAGE FORMING APPARATUS

TECHNICAL FIELD

The present invention relates to a fixing member, a manufacturing method of the fixing member, a rotational body of the fixing member, a fixing device, and an image forming apparatus, and more particularly to a thermally-conductive, elastic fixing body included in a rotational body for fixing toner.

BACKGROUND ART

Conventionally, in a device used for outputting high-quality images, such as an electrophotographic copier, a printer, and particularly a device for outputting a color electrophotographic image, silicon rubber is often used as the material of a fixing member, so as to flexibly and closely contact the toner, and to attain heat resistance. However, such a heat-resistant rubber material has low heat conductivity, and thus acts as a heat-resistant layer when transferring heat from a heat source to a recording material. When producing color images, it is important to use a particularly soft rubber layer for improving the image quality. However, due to high heat capacity and high heat resistance, the startup time of the fixing device including such a fixing member is delayed. Furthermore, in the case of a high-speed device, the heat cannot be supplied quickly enough. Therefore, attempts have been made to increase the thermal conductivity with the use of filler, as disclosed in patent documents 1 and 2.

Patent Document 1: Japanese Laid-Open Patent Application No. 2006-133576

Patent Document 2: Japanese Laid-Open Patent Application No. 2005-292218

However, according to patent documents 1 and 2, the density of the fixing member cannot be decreased. By decreasing the density, the heat capacity can be decreased, which consequently speeds up the startup time. However, this cannot be accomplished in the conventional technology because the density cannot be decreased.

There are two reasons why the density of the fixing member cannot be decreased. The first reason is that as the expansion ratio is increased, the thermal conductivity may rapidly decrease. This happens when the thermal conductivity of the original substance does not change (for example, see "Netsubussei (thermal property) handbook", published by Yokendo, formula of Eucken on page 179 of C.2). The second reason is that as the expansion ratio is increased, the walls of the fixing member become relatively thin, and therefore the strength declines. The expansion ratio is expressed by $(Vf+Vs)/Vs$, where $Vs$ is the volume of the fixing member when there are no air bubbles, and $Vf$ is the volume of the air bubbles.

Due to the above two reasons, it has been difficult to develop a fixing device having low heat capacity (low density), high-thermal conductivity; and heat resistance, which is repeatedly deformed in a high-temperature environment.

Accordingly, there is a need for a fixing member having low heat capacity (low density), high-thermal conductivity, and a low rubber hardness, with which a fixing device of an image forming apparatus can start up at high speed, a manufacturing method of the fixing member, a rotational body for the fixing member, and a fixing device and an image forming apparatus including the fixing member.

DISCLOSURE OF THE INVENTION

The present invention may solve one or more problems of the related art.

A preferred embodiment of the present invention may provide a fixing member having low heat capacity (low density), high-thermal conductivity, and a low rubber hardness, with which a fixing device of an image forming apparatus can start up at high speed, a manufacturing method of the fixing member, a rotational body of the fixing member, a fixing device, and an image forming apparatus.

According to an aspect of the present invention, there is provided a fixing member included on a fixing rotational body having a heat source built therein, wherein the fixing rotational body is configured to fix unfixed toner onto a recording medium as the recording medium carrying the unfixed toner passes through a nip portion formed between the fixing rotational body and a pressurizing unit that comes into pressure contact with the fixing rotational body via the recording medium; and the fixing member is made of silicon rubber including carbon fiber, wherein vacant spaces are formed in the silicon rubber.

According to an aspect of the present invention, there is provided a method of manufacturing a fixing member included on a fixing rotational body having a heat source built therein, wherein the fixing rotational body is configured to fix unfixed toner onto a recording medium as the recording medium carrying the unfixed toner passes through a nip portion formed between the fixing rotational body and a pressurizing unit that comes into pressure contact with the fixing rotational body via the recording medium, the method including a step of including a foaming agent or foamed particles in unvulcanized silicon rubber; a step of including carbon fiber in the unvulcanized silicon rubber; a step of performing primary vulcanization and a foaming operation on the unvulcanized silicon rubber; and a step of performing secondary vulcanization on the silicon rubber which has undergone the primary vulcanization.

According to an aspect of the present invention, there is provided a method of manufacturing a fixing member included on a fixing rotational body having a heat source built therein, wherein the fixing rotational body is configured to fix unfixed toner onto a recording medium as the recording medium carrying the unfixed toner passes through a nip portion formed between the fixing rotational body and a pressurizing unit that comes into pressure contact with the fixing rotational body via the recording medium, the method including a step of including carbon fiber and pre-foamed particles in unvulcanized silicon rubber; a step of performing primary vulcanization on the unvulcanized silicon rubber; and a step of performing secondary vulcanization on the silicon rubber which has undergone the primary vulcanization.

BRIEF DESCRIPTION OF THE DRAWINGS

FIGS. 6A through 6D are cross-sectional views of a structure of a fixing roller;

BEST MODE FOR CARRYING OUT THE INVENTION

A description is given, with reference to the accompanying drawings, of an embodiment of the present invention.

Figure 1:
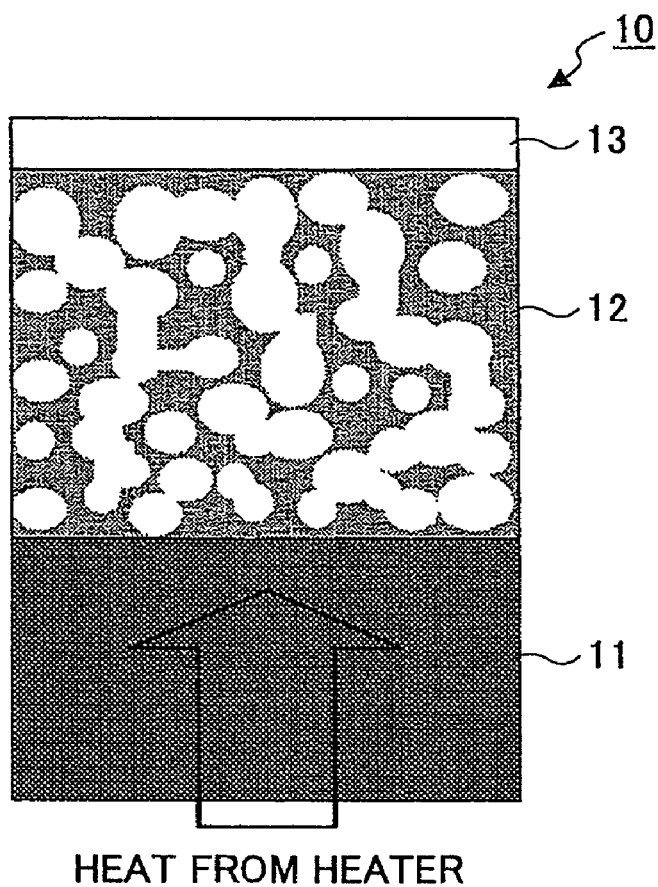
FIG. 1 is a partial cross-sectional view of a fixing member according to an embodiment of the present invention.
Figure 2:
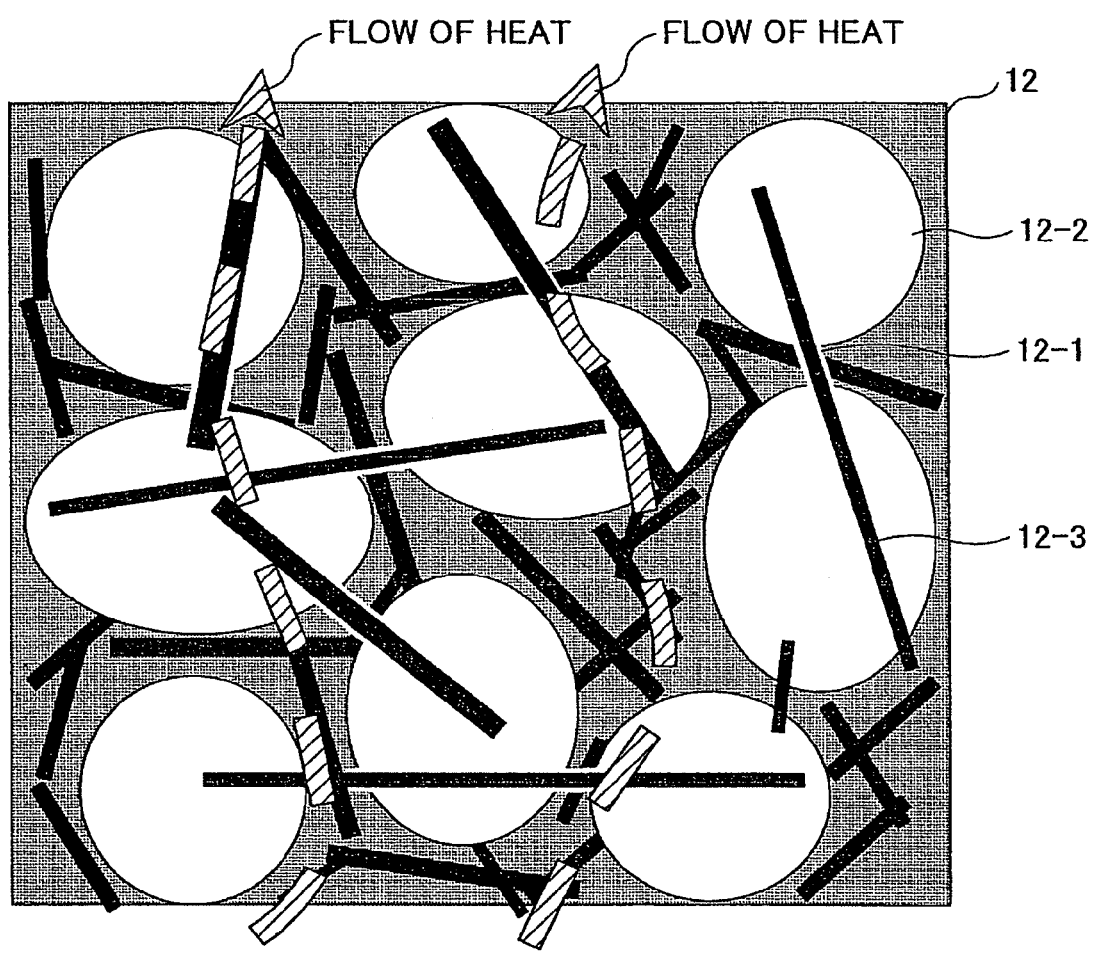
FIG. 2 illustrates the relationship between a bubble continuation structure and carbon fiber in a silicon rubber layer shown in FIG. 1.

FIG. 1 is a partial cross-sectional view of a fixing member according to an embodiment of the present invention. As shown in FIG. 1, a fixing member 10 according to an embodiment of the present invention includes a metal roller 11, a silicon rubber layer 12, and a PFA layer 13, which are laminated onto each other. As shown in FIG. 2, the silicon rubber layer 12 includes bubbles 12-2 corresponding to vacant spaces, which are continuous bubbles connected via bubble continuation parts 12-1, and carbon fiber 12-3. With the use of the fixing member 10 having such a lamination structure, as illustrated in FIG. 1, the heat from a heater (not shown) that is the heat source is transferred to the metal roller 11, and the heat from the metal roller 11 is transferred to the PFA layer 13 through the silicon rubber layer 12. Accordingly, heat is transferred to the toner as the PFA layer 13 contacts the toner, thereby fixing the toner.

Figure 3:
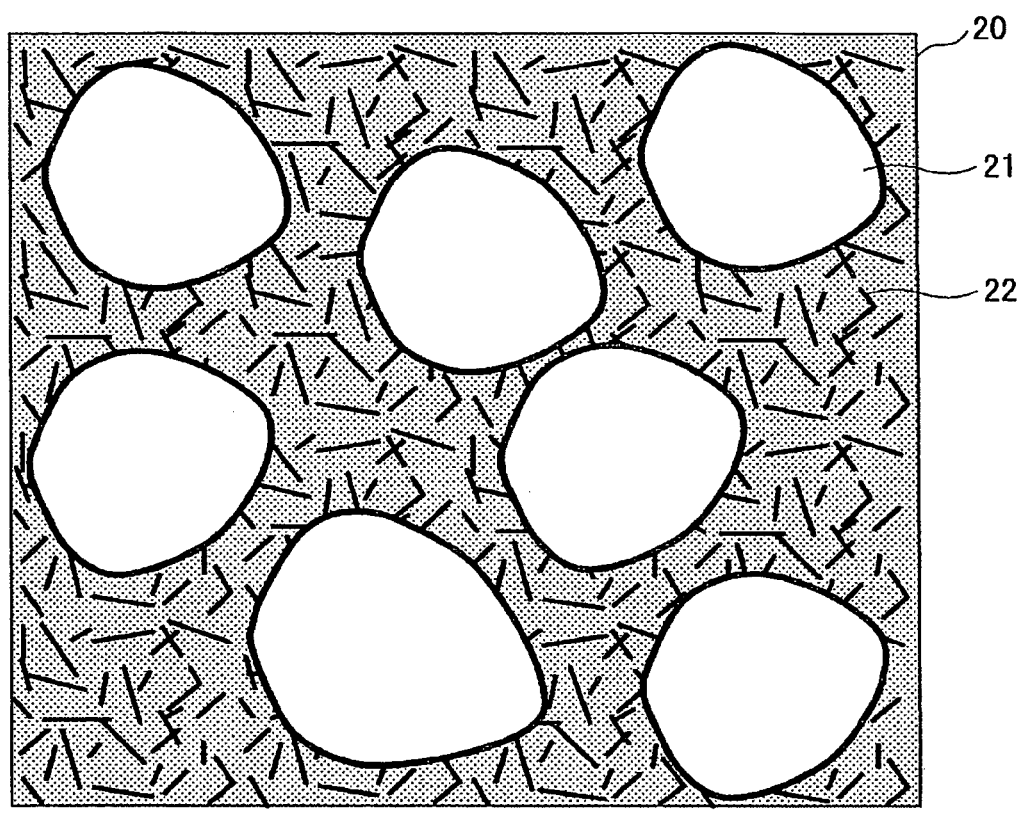
FIG. 3 is an enlarged view of a silicon rubber layer having a single bubble structure.

FIG. 2 is an enlarged view showing the relationship between the continuous bubble structure and the carbon fiber in the silicon rubber layer 12. The bubbles 12-2 adjacent to each other are connected at the bubble continuation parts 12-1, and therefore the gas inside the bubbles 12-2 can flow through the bubble continuation parts 12-1 when the bubbles 12-2 are deformed. FIG. 3 is an enlarged view of a silicon rubber layer having a single bubble structure, which corresponds to the comparative example 7 described below. As shown in FIG. 3, a silicon rubber layer 20 having a single bubble structure includes bubbles 21 without the bubble continuation parts shown in FIG. 2, and carbon fiber 22. Therefore, the gas cannot move among the vacant spaces, and consequently, the rigidness of the carbon fiber has an impact on the properties of the silicon rubber. An optimum product of the carbon fiber is pitch type milled carbon fiber, part number: XN-100-15M (150 microns), manufactured by Nippon Graphite Fiber Corporation. The thermal conductivity is assumed to be 500 W/mK. Meanwhile, PAN type carbon fiber has a maximum thermal conductivity of 50 W/mK. A PFA tube has an adhesive layer formed inside in advance, and a cored bar with reinforcement projections ("ribs") is set at 0.5 mm inside the PFA tube. Unvulcanized silicon rubber including carbon fiber, pre-foamed particles, and a hardening agent, is infused as an infusion material in between the cored bar and the PFA tube. Then, secondary heating is performed to fix the infusion material. As a result, the pre-foamed agent is destroyed, and the peripheral portions of the carbon fiber are separated from the silicon rubber. In order to make the carbon fiber efficiently separate from the silicon rubber and to form spaces at the separated portions, glycerin, ethylene glycol, diethylene glycol, and triethylene glycol are used. These elements have a volatile effect, so that the spaces can be formed. It is also possible to prepare silicon unvulcanized liquid in the same manner as above, and apply/vulcanize this liquid onto the roller to form a fluorocarbon resin coat layer, or coat the roller with a fluorocarbon resin tube.

Figure 4:
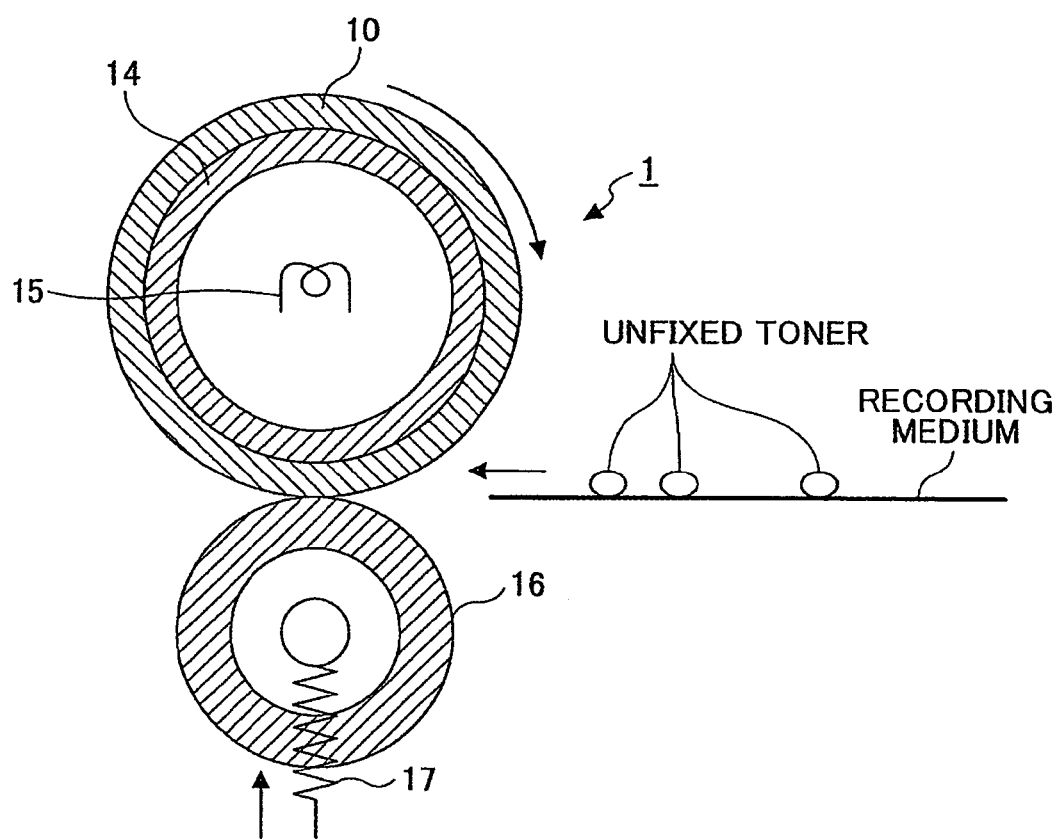
FIG. 4 is a schematic cross-sectional view of a fixing device according to another invention, which includes the fixing member according to an embodiment of the present invention.

FIG. 4 is a schematic cross-sectional view of a fixing device according to another invention, which includes the fixing member according to an embodiment of the present invention. A fixing device 1 according to another invention, which includes the fixing member according to an embodiment of the present invention, has a heater 15 provided inside a roller-type cored bar 14, and a fixing member 10 according to an embodiment of the present invention is formed on the peripheral surface of the cored bar 14. A pressurizing roller 16 faces such a fixing roller. The pressurizing roller 16 is pressed against the fixing roller with a pressurizing mechanism 17 such as a spring. Accordingly, a recording medium on which an unfixed toner image is formed can be sandwiched and pressurized by the fixing roller and the pressurizing roller 16, so that the unfixed toner on the recording medium is fixed.

Figure 5:
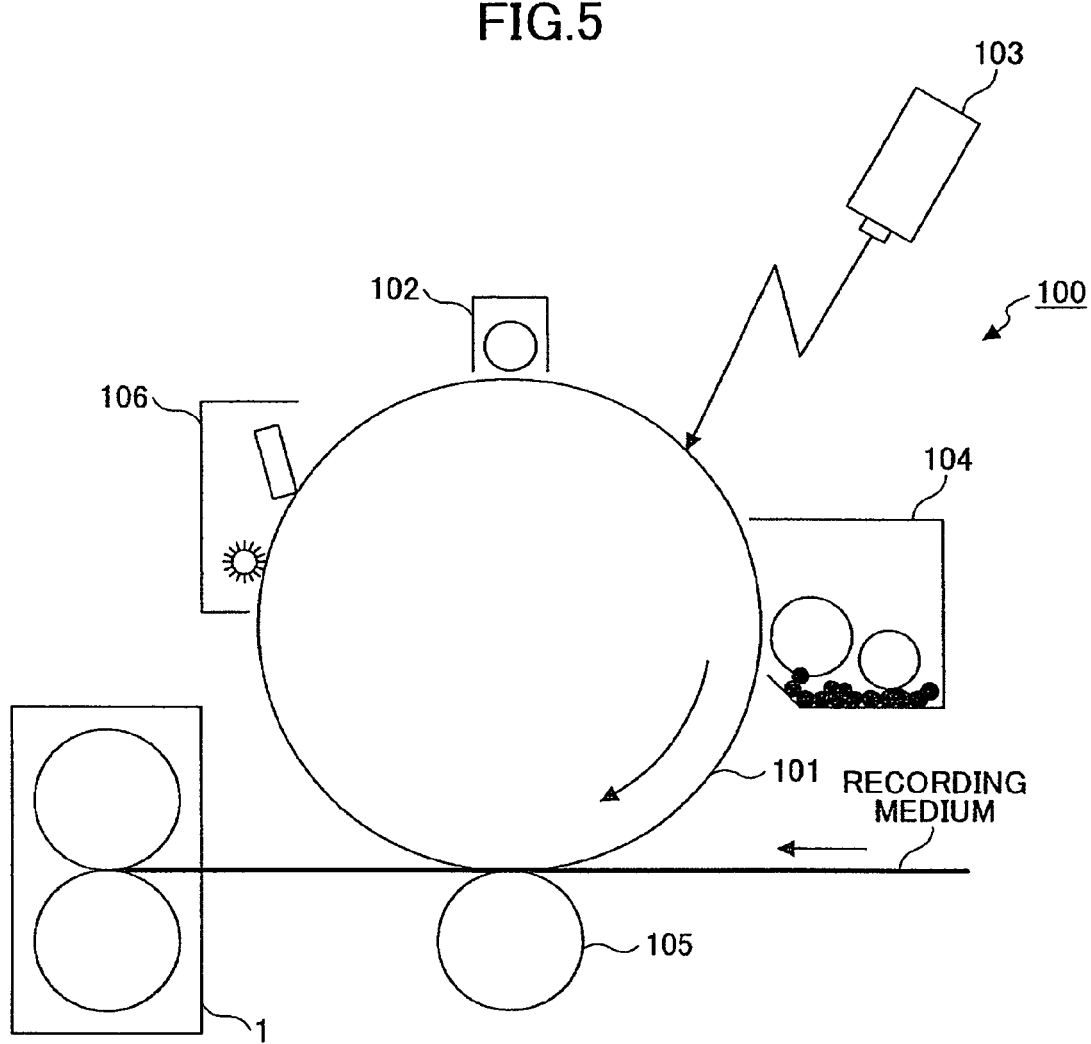
FIG. 5 is a schematic cross-sectional view of an image forming apparatus according to another invention, including the fixing device according to an embodiment of the present invention.

FIG. 5 is a schematic cross-sectional view of an image forming apparatus according to another invention, including the fixing device according to an embodiment of the present invention. An image forming apparatus 100 according to another invention, provided with the fixing device according to an embodiment of the present invention, includes a photoconductor 101 surrounded by a charger 102, a writing device 103, a developing unit 104, a transfer device 105, and a cleaning device 106. The charger 102 charges the photoconductor 101 to a positive polarity, and the writing device 103 writes optical information based on image information onto the charged photoconductor 101, thereby forming a visible latent image. Next, the developing unit 104 uses toner that has been stirred and charged, to turn the visible latent image into a toner image. The toner image is transferred onto a recording medium by the transfer device 105. The unfixed toner that has been transferred onto the recording medium is fixed onto the recording medium, by conveying the recording medium carrying the unfixed toner to the nip portion between the fixing roller and the pressurizing roller in the fixing device 1, as described with reference to FIG. 4.

The fluorocarbon resin used in an embodiment of the present invention is preferably produced by burning to have good melted-state film-forming characteristics, and preferably has a relatively low melting point (preferably 250° C. through 300° C.). Specifically, impalpable powder of low-molecular weight polytetrafluoroethylene (PTFE), tetrafluoroethylene-hexafluoropropylene copolymer (FEP), and tetrafluoroethylene-perfluoroalkylvinylether copolymer (PFA) may be selected. More specifically, as low-molecular weight polytetrafluoroethylene (PTFE) powder, LUBRON (registered trademark) L-5, L-2 (manufactured by Daikin Industries, Ltd.), MP1100, 1200, 1300, and TLP-10F-1 (manufactured by DuPont-Mitsui Fluorochemicals, Co., Ltd.) are known. As tetrafluoroethylene-hexafluoropropylene copolymer (FEP) powder, 532-8000 (manufactured by DuPont) is known. As tetrafluoroethylene-perfluoroalkylvinylether copolymer (PFA), MP-10, MP102 (manufactured by DuPont-Mitsui Fluorochemicals, Co., Ltd.) are known. In particular, products which have a low MFR (melted flow rate) and low fluidity are appropriate for the present invention, such as MP103, MP300 (manufactured by DuPont-Mitsui Fluorochemicals, Co., Ltd.) and AC-5600, AC5539 (manufactured by Daikin Industries, Ltd.).

Furthermore, an example of the foaming agent is azobisisobutyronitrile (AIBN), and examples of the foamed particles are F-30, F-30VS, F-46, F-50D, and F-55D manufactured by Matsumoto Yushi-Seiyaku Co., Ltd. Examples of the pre-foamed particles are 100CA, 80CA, F-80ED, F-30E, F-50E, and F-80SDE manufactured by Matsumoto Yushi- Seiyaku Co., Ltd. Examples of the carbon fiber are PAN (polyacrylonitrile) type carbon fiber made from continuous acrylic fiber which is synthetic fiber, and pitch type carbon fiber made form coal tar and petroleum pitch. The PAN type carbon fiber is obtained by carbonizing a PAN precursor (polyacrylonitrile fiber), and has high strength and a high degree of elasticity. The pitch type carbon fiber is obtained by carbonizing a pitch precursor (pitch fiber obtained by using coal tar or petroleum heavy oil as the material). By changing the conditions of the manufacturing process, a wide range of properties can be achieved, from a low level of elasticity to a high level of elasticity/high strength. A super-high elasticity product may have high rigidity, excellent thermal conductivity, and electrical conductivity.

Practical Examples A and Comparative Examples A

Figure 7:
FIG. 7 is a cross-sectional view of carbon fiber which has not been heat-treated.
Figure 8:
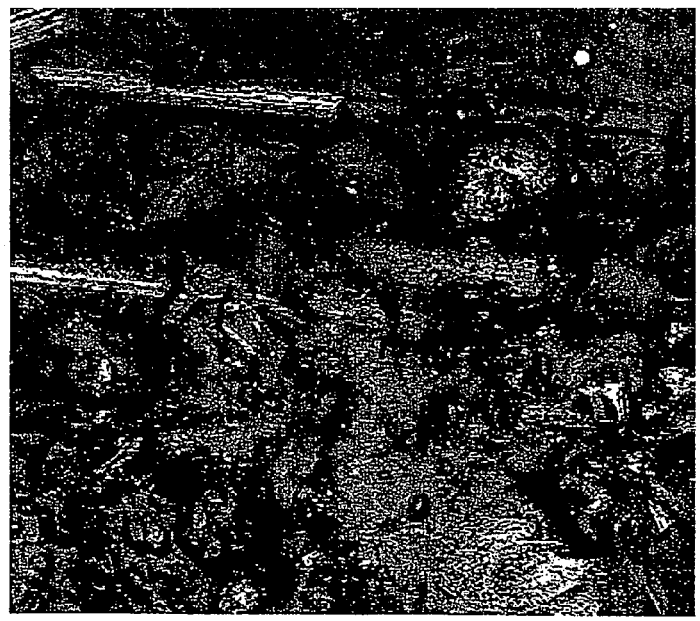
FIG. 8 is a cross-sectional view of carbon fiber which has been heat-treated.

In an additive liquid silicon including a hardening agent, powders of F-80ED and XN-100-15M (150 microns) were dispersed. XN-100-15M was mixed in advance with glycerin corresponding to one-eighth of the total amount. "MAZERUSTAR", manufactured by KURABO INDUSTRIES LTD., was used for the mixing operation. Carbon fiber having glycerin mixed therein was used, except for carbon fiber that has undergone a heat treatment. The aforementioned carbon fiber was used to decrease the adhesion within the silicon rubber. As shown in FIG. 6A, this unvulcanized silicon rubber was infused as an infusion material between a PFA tube and a cored bar, where the cored bar with ribs corresponding to reinforcement projections was set at 0.5 mm inside the PFA tube which had an adhesive layer formed inside in advance. FIGS. 6B through 6D illustrate examples of cross-sectional views of the rib 31. Primary vulcanization was performed by heating this fixing roller at 120° C., and then secondary vulcanization was performed by heating this fixing roller for four hours at 200° C. Accordingly, the pre-foamed agent was destroyed, and the peripheral portions of the carbon fiber were separated from the silicon rubber. The fixing roller was fabricated by performing the above series of processes, so as to have an outer diameter of φ40 mm. The silicon rubber layer thickness was 3 mm. This fixing roller was set in a fixing unit of MF4570, which is a copier manufactured by Ricoh Co., Ltd., and the time (seconds) required for the temperature of the fixing roller to rise to 160° C. by heating it with a 1000 W halogen heater, was measured. As for the pressurizing roller, instead of using silicon rubber of a standard product, silicon rubber similar to that of an embodiment of the present invention was used, without the carbon fiber. The temperature was measured by providing a thermocouple above the fixing roller. An infusion material having the same composition as that used for fabricating the roller was infused/vulcanized into a mold having a thickness of 2 mm and length and width of 100 mm. The expansion ratio was obtained from the volume, the weight, and the blending quantity of this sample. The rubber hardness of this sample was measured. Furthermore, the sample was cut into squares with sides of 50 mm. Three of these square pieces were stacked onto each other, and the compression set was measured at compression of 25% after being heated at 180° C. for 22 hours. The thickness of the cored bar was 0.4 mm with ribs. The rubber hardness was measured with the use of a micro rubber hardness scale MD-1: type A for general purpose rubber (JIS A approximate value). In the tables below, this is indicated as rubber hardness (MD-1). In the comparative example A-4, the carbon fiber was heated in air at 600° C. for two hours. In comparative examples A-5 and A-6, glass fiber was used. In comparative example A-5, the fiber was 06MW2-20 manufactured by ASAHI FIBER GLASS Co., Ltd., having a length of 100 μm through 300 μm, without a primer. In comparative example 6, 20 MH2-20 was used, which is a glass fiber similar to the above, having a length of 100 μm through 300 μm, and treated with a silane-type primer. FIG. 7 is a cross-sectional view of carbon fiber cut with a razor blade, which has not been heat-treated. The linear, shining parts are the carbon fibers, which are separated from the silicon rubber, and are thus visible. FIG. 8 is a cross-sectional view of carbon fiber cut with a razor blade, which has been heated in air at 600° C. for two hours. Silicon rubber is adhering around the carbon fibers. The carbon fibers are not very visible because the parts of the silicon rubber have been cut. As described above, it can be obviously confirmed that there are significant non-adhering portions around the carbon fibers.

It is known that carbon fiber starts oxidizing in air by a slight amount when the temperature reaches 300° C., and it is considered that the adhesiveness increases because an oxidation layer is formed on the surface. As for the examples using glass fiber, the fiber was substantially completely contacting the silicon rubber in both examples, although not shown in figures. XN-100-05M (50 microns) used in comparative example A-7 was heated in air at 600° C. for two hours, as a matter of comparison.

TABLE 1

| COMPOSITION (PARTS BY WEIGHT) | COMPARATIVE EXAMPLE A-1 | PRACTICAL EXAMPLE A-1 | PRACTICAL EXAMPLE A-2 | PRACTICAL EXAMPLE A-3 | COMPARATIVE EXAMPLE A-2 | COMPARATIVE EXAMPLE A-3 |
|---|---|---|---|---|---|---|
| SILICON RUBBER | 100 | 100 | 100 | 100 | 100 | 100 |
| CARBON FIBER | | | | | | |
| XN-100-15M | 40 | 40 | 40 | 40 | 40 | |
| PAN TYPE | | | | | | 40 |
| F-80ED (EXPANSION RATIO) | 1.3 | 1.5 | 2.0 | 3.0 | 4.0 | 2.0 |
| RUBBER HARDNESS (MD-1) | 23 | 18 | 8 | 11 | 10 | 18 |
| TIME TAKEN FOR TEMPERATURE TO RISE (sec) | 38 | 28 | 16 | 18 | 32 | 67 |
| COMPRESSION SET (%) | 5 | 7 | 9 | 9 | 23 | 8 |

TABLE 2

| COMPOSITION (PARTS BY WEIGHT) | COMPARATIVE EXAMPLE A-4 | COMPARATIVE EXAMPLE A-5 | COMPARATIVE EXAMPLE A-6 | COMPARATIVE EXAMPLE A-7 |
|---|---|---|---|---|
| SILICON RUBBER | 100 | 100 | 100 | 100 |
| CARBON FIBER | | | | |
| XN-100-15M (600) | 40 | | | |
| XN-100-05M (600) | | | | 40 |
| GLASS FIBER | | 40 | 40 | |
| F-80ED (EXPANSION RATIO) | 3.0 | 3.0 | 3.0 | 3.0 |
| RUBBER HARDNESS (MD-1) | 38 | 35 | 42 | 28 |
| TIME TAKEN FOR TEMPERATURE TO RISE (sec) | — | — | — | — |
| COMPRESSION SET (%) | 32 | 26 | 25 | 25 |

As shown in Tables 1 and 2, in practical examples A-1, A-2, and A-3, the rubber hardness was extremely low, and the compression set was also low. Furthermore, the startup time of the fixing device was less than or equal to 30 seconds. As for comparative examples A-1 and A-3, the startup time was delayed, and in comparative example A-2, the compression set was extremely high and the heating roller was deformed after maintaining the heating/pressurizing state at 160° C. for 100 hours. In comparative examples A-4, A-5, A-6, and A-7, a roller was not fabricated, but it was found that the rubber hardness and the compression set were high.

Practical Examples B and Comparative Examples B

Next, in an additive liquid silicon including a hardening agent, powders of F-30 and XN-100-15M (150 microns) were dispersed. This unvulcanized silicon rubber was infused as an infusion material between a PFA tube and a cored bar, where the cored bar having ribs was set at 0.5 mm inside the PFA tube having an adhesive layer formed inside in advance. Primary vulcanization was performed by heating this fixing roller at 130° C., so that F-30 was foamed, and then secondary vulcanization was performed by heating this fixing roller for four hours at 200° C. Evaluations were made in the same manner as those for practical examples A.

TABLE 3

| COMPOSITION (PARTS BY WEIGHT) | COMPARATIVE EXAMPLE B-1 | PRACTICAL EXAMPLE B-1 | PRACTICAL EXAMPLE B-2 | PRACTICAL EXAMPLE B-3 | COMPARATIVE EXAMPLE B-2 | COMPARATIVE EXAMPLE B-3 |
|---|---|---|---|---|---|---|
| SILICON RUBBER | 100 | 100 | 100 | 100 | 100 | 100 |
| CARBON FIBER | | | | | | |
| XN-100-15M | 40 | 40 | 40 | 40 | 40 | |
| XN-100-05M | | | | | | 40 |
| F-30 (EXPANSION RATIO) | 1.3 | 1.5 | 2.0 | 3.0 | 4.0 | 2.0 |
| RUBBER HARDNESS (MD-1) | 25 | 20 | 11 | 12 | 13 | 18 |
| TIME TAKEN FOR TEMPERATURE TO RISE (sec) | 43 | 21 | 12 | 15 | 32 | 73 |
| COMPRESSION SET (%) | 5 | 7 | 9 | 9 | 20 | 8 |

In practical examples B-1, B-2, and B-3, the rubber hardness was low, and the compression set was also low. Furthermore, the startup time of the fixing device was less than or equal to 30 seconds. As for comparative examples B-1 and B-3, the startup time was delayed, and in comparative example B-2, the compression set was extremely high and the heating roller was deformed after maintaining the heating/pressurizing state at 160° C. for 100 hours.

Comparative Examples C

In an additive liquid silicon including a hardening agent, powders of F-30 and XN-100-15M (150 microns) were dispersed. This unvulcanized silicon rubber was infused as an infusion material between a PFA tube and a cored bar, where the cored bar with ribs corresponding to reinforcement projections was set at 0.5 mm inside the PFA tube which has an adhesive layer formed inside in advance. Primary vulcanization was performed by heating this fixing roller at 130° C., so that F-30 was foamed. The secondary vulcanization (four hours at 200° C.) was not performed. Accordingly, a roller having an outer diameter of φ40 mm was fabricated. This fixing roller was set in a fixing unit of MF4570, which is a copier manufactured by Ricoh Co., Ltd., and the time (seconds) required for the temperature of the fixing roller to rise to 160° C. by heating it with a 1000 W halogen heater, was measured. The blending was performed in units of parts by weight; as for F-30, the expansion ratio of bubbles formed after foaming was converted into volume. The wall thickness of the cored bar was 0.4 mm with ribs.

TABLE 4

| COMPOSITION (PARTS BY WEIGHT) | COMPARATIVE EXAMPLE C-1 | COMPARATIVE EXAMPLE C-2 |
| --- | --- | --- |
| SILICON RUBBER | 100 | 100 |
| CARBON FIBER XN-100-15M PAN TYPE | 40 | 40 |
| F-30 (EXPANSION RATIO) | 2.0 | 3.0 |
| TIME TAKEN FOR TEMPERATURE TO RISE (sec) | 35 | 40 |
| COMPRESSION SET (%) | 27 | 36 |

By comparing the practical examples B-2, B-3 with comparative examples C-1, C-2, it is found that the compression set can be made extremely small by performing the primary vulcanization so that the rubber is foamed and fixed, and then performing the secondary vulcanization.

Practical Examples C

Practical examples C were fabricated by changing the thickness of the cored bar in the fixing member of practical example B-2.

It was found that the when the wall thickness of the cored bar was less than or equal to 0.5 mm, the time required for the temperature of the fixing roller to rise to 160° C. was less than or equal to 20 seconds, and when the thickness of the cored bar was less than or equal to 0.2 mm, the fixing roller broke.

Practical Example D

The roller of practical example B-2 was set in a fixing unit in MF4570 manufactured by Ricoh Co., Ltd. Then, 10,000 sheets of solid black images produced by imagio MP C4500 manufactured by Ricoh Co., Ltd., were passed through the fixing unit. Then, examinations were made as to the amount of toner adhering to the roller surface, and whether any paper sheets adhered around the roller, as shown in Table 6. Accordingly, it was found that the roller is effective when the surface roughness Rz (ten point average roughness: JIS (Japanese Industrial Standards) B0601-1994) is less than or equal to 5 μm. With a roller with a surface roughness Rz of 7 μm was used, paper jams started to occur frequently, and therefore the experiment was aborted at the 7,325th sheet.

TABLE 6

| SURFACE ROUGHNESS Rz | AMOUNT OF ADHERING TONER | SHEETS ADHERING AROUND ROLLER |
| --- | --- | --- |
| 2 μm | NONE | NONE |
| 3 μm | NONE | NONE |
| 5 μm | SLIGHT AMOUNT | NONE |
| 7 μm | LARGE AMOUNT | JAM OCCURRED FREQUENTLY |

Practical Example E

A sheet passing test was performed for an unfixed image created with IPSIO Color 8100 manufactured by Ricoh Co., Ltd. The toner used in IPSIO Color 8100 has insufficient mold releasing properties, and therefore there was provided an oil applying member impregnated with silicon oil to apply silicon oil onto the fixing roller. Then, 10,000 sheets of solid black images were passed through the IPSIO Color 8100, and the extent of toner adhering to the roller surface was examined. No significant amount of toner was observed, and the roller appeared to be in a regular state. However, in cases

TABLE 5

| COMPOSITION (PARTS BY WEIGHT) | COMPARATIVE EXAMPLE C-3 | COMPARATIVE EXAMPLE C-4 | COMPARATIVE EXAMPLE C-5 | PRACTICAL EXAMPLE C-1 | PRACTICAL EXAMPLE C-2 | COMPARATIVE EXAMPLE C-6 |
| --- | --- | --- | --- | --- | --- | --- |
| SILICON RUBBER | 100 | 100 | 100 | 100 | 100 | 100 |
| CARBON FIBER XN-100-15M | 40 | 40 | 40 | 40 | 40 | 40 |
| F-30 (EXPANSION RATIO) | 2.0 | 2.0 | 2.0 | 2.0 | 2.0 | 2.0 |
| THICKNESS OF CORED BAR (mm) | 0.6 | 0.5 | 0.4 | 0.3 | 0.25 | 0.2 |
| TIME TAKEN FOR TEMPERATURE TO RISE (sec) | 43 | 18 | 12 | 11 | 8 | 8 |
| COMPRESSION SET (%) | NOT BROKEN | NOT BROKEN | NOT BROKEN | NOT BROKEN | NOT BROKEN | BROKEN | where the oil applying member was not provided, a significant amount of toner adhered to the roller at the 6,000th sheet.

Practical Example F

A roller of practical example F was made by making the roller of practical example A-1 have a surface roughness Rz of less than or equal to 2 μm. A fixing test machine including the fixing unit of MF4570 was fabricated, and unfixed images produced by imagio MP C4500 were passed through the roller, with different pressures. As shown in Table 7, when the pressure was less than or equal to 2.9 N/cm$^2$, the fixing properties were very poor, and when the pressure was greater than or equal to 19.6 N/cm$^2$, toner adhered to the fixing roller. Sheets adhered around the fixing roller when even more toner adhered to the fixing roller. When the pressure was less than or equal to 39.2 N/cm$^2$, the sheets did not adhere around the fixing roller. The fixing properties were simply assessed by using a cloth to wipe a solid image after the fixing operation, and determining that a fixing failure has occurred when a significant amount of toner adhered to the cloth.

According to an embodiment of the present invention, an expansion ratio of the fixing member is greater than or equal to 1.5 and less than or equal to 3.0. If the expansion ratio were less than 1.5, the heat capacity would be large, and therefore the fixing member could not be made thick enough to attain a large nip. If the expansion ratio were to exceed 3.0, the walls would be extremely thin, and therefore the strength would decrease and the compression set would increase. Accordingly, when the fixing member has an expansion ratio falling in a range of greater than or equal to 1.5 and less than or equal to 3.0, low heat capacity and high strength can be attained, so that the fixing operation can be properly performed.

According to an embodiment of the present invention, the cored bar of the fixing rotational body is the first component to be heated by the heater in the roller, and therefore heat capacity is an important factor. If the cored bar has a thickness of less than or equal to 0.5 mm, the fixing device can start up within 10-odd seconds. However, the strength with respect to flexure will decrease. For this reason, projections having cir-

TABLE 7

| PRESSURE (N/cm$^2$) | AMOUNT OF TONER ADHERING TO ROLLER | SHEETS ADHERING AROUND TONER | FIXING PROPERTY (WIPED WITH COTTON CLOTH) |
|---|---|---|---|
| 2.5 | NONE | NONE | TONER ADHERED TO CLOTH (FIXING FAILURE) |
| 2.9 | NONE | NONE | TONER ADHERED TO CLOTH (FIXING FAILURE) |
| 4.9 | NONE | NONE | TONER DID NOT ADHERE TO CLOTH (SUCCESSFULLY FIXED) |
| 9.8 | NONE | NONE | TONER DID NOT ADHERE TO CLOTH (SUCCESSFULLY FIXED) |
| 19.6 | SOME AMOUNT | NONE | TONER DID NOT ADHERE TO CLOTH (SUCCESSFULLY FIXED) |
| 39.2 | SOME AMOUNT | NONE | TONER DID NOT ADHERE TO CLOTH (SUCCESSFULLY FIXED) |
| 41.2 | LARGE AMOUNT | JAM OCCURRED FREQUENTLY | TONER DID NOT ADHERE TO CLOTH (SUCCESSFULLY FIXED) |

According to an embodiment of the present invention, in the fixing member, the carbon fiber acts as a path for transferring heat. The carbon fiber is not firmly fixed and can therefore easily deform by slipping. Accordingly, the fixing member is prevented from being destroyed due to concentration of stress on the silicon rubber, and the compression set can be decreased. Thus, the rigidity of the carbon fiber and the gas flowing among the vacant spaces can be increased, so that a fixing member can be provided, which has low heat capacity (low density), high thermal conductivity, and a low rubber hardness.

According to an embodiment of the present invention, the fixing member can have a sufficient level of thermal conductivity.

According to an embodiment of the present invention, the fixing member can be easily manufactured, and the compression set can be decreased.

cling shapes are formed on the inner surface of the cored bar for reinforcement. Accordingly, a fixing device that can start up at high speed is provided.

According to an embodiment of the present invention, the fixing rotational body is applicable to a durable induction heater, with which parting properties can be attained even with respect to oil-less toner.

According to an embodiment of the present invention, the roller has good thermal conductivity and low rubber hardness so that heat can be uniformly transferred, and the fixing member has high film strength, thereby providing a fixing device and a image forming apparatus that are highly reliable and that have good energy efficiency.

The present invention is not limited to the specifically disclosed embodiment, and variations and expansions may be made without departing from the scope of the present invention.

The present application is based on Japanese Priority Patent Application No. 2008-072727, filed on Mar. 21, 2008, the entire contents of which are hereby incorporated by reference.

The invention claimed is:

1. A fixing member, comprising:
a fixing rotational body having a heat source built therein, wherein:
the fixing rotational body is configured to fix unfixed toner onto a recording medium as the recording medium carrying the unfixed toner passes through a nip portion formed between the fixing rotational body and a pressurizing unit that comes into pressure contact with the fixing rotational body via the recording medium,
the fixing member is made of silicon rubber having carbon fiber, wherein a plurality of vacant spaces are formed in the silicon rubber;
the carbon fiber is a pitch type carbon fiber,
the carbon fiber has a shape in which a length of the carbon fiber is longer than a diameter of the vacant spaces,
a part of the carbon fiber is provided inside the vacant spaces, and other part of the carbon fiber is provided inside a bubble continuation part connecting the vacant spaces to each other not adhered to the silicon rubber, and
the carbon fibers in the silicon rubber contact each other to form paths for transferring heat.

2. A fixing rotational body comprising the fixing member according to claim 1.

3. The fixing rotational body according to claim 2, comprising:
a cored bar which is a metal roller, wherein:
the cored bar has a thickness that is greater than or equal to 0.25 mm and less than or equal to 0.5 mm; and
plural projections having circling shapes are formed on an inner surface of the cored bar.

4. The fixing rotational body according to claim 2 comprising:
a layer made of fluorine polymer, which is provided on an outermost surface of the fixing rotational body.

5. The fixing rotational body according to claim 2 wherein:
the fixing rotational body has a surface roughness Rz (ten point average roughness) of less than or equal to 5 μm.

6. A fixing device comprising the fixing rotational body according to claim 2.

7. An image forming apparatus comprising:
the fixing device according to claim 6; and
an image forming unit, wherein:
a toner image is formed on a recording medium at the image forming unit; and
the toner image is fixed onto the recording medium at the fixing device.

* * * * *